Feb. 20, 1923.  
B. THOMAS  
1,446,405
PROCESS OF RECOVERING THE PRECIOUS METALS FROM FIXING SOLUTIONS
USED IN PHOTOGRAPHY AND OF REGENERATING THE FIXING AGENT
Filed Jan. 10, 1922
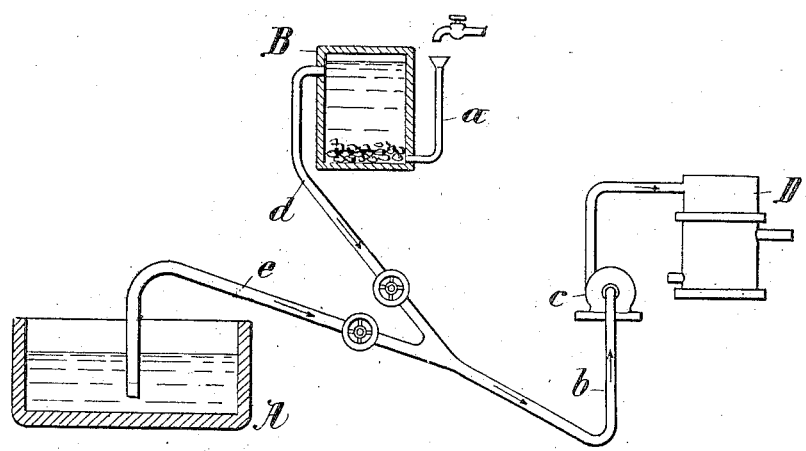

Patented Feb. 20, 1923.

1,446,405

UNITED STATES PATENT OFFICE.

BRUNO THOMAS, OF VIENNA, AUSTRIA.

PROCESS OF RECOVERING THE PRECIOUS METALS FROM FIXING SOLUTIONS USED IN PHOTOGRAPHY AND OF REGENERATING THE FIXING AGENT.

Application filed January 10, 1922. Serial No. 528,206.

*To all whom it may concern:*

Be it known that I, BRUNO THOMAS, a citizen of the Republic of Austria, and residing at Vienna, Austria, have invented certain new and useful Improvements in Processes of Recovering the Precious Metals from Fixing Solutions Used in Photography and of Regenerating the Fixing Agent, of which the following is a specification.

This invention relates in general to improvements in the art of recovering the precious metals from used photographic fixing solutions, and more particularly to the precipitation of the precious metals, especially silver, from fixing solutions containing a thiosulphate, according to the known reaction:

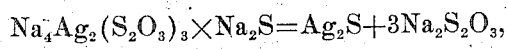

$$Na_4Ag_2(S_2O_3)_3 \times Na_2S = Ag_2S + 3Na_2S_2O_3,$$

which reaction causes simultaneously the regeneration of the fixing agent.

The practical use of this process is hampered, however, by the adverse nature of the precipitate, which in the ordinary way of carrying out the process, can be separated from the bath only with great loss. The precipitate when standing for a time in contact with the bath, becomes colloidal and forms a deposit of slimy mud on the bottom and the sides of the precipitation-pan, wherefrom it may be detached only with great difficulty and very incompletely. Especially in great factories, with thousands of cubic feet of fixing baths, the recovering of the precious metals contained mainly in the mud remaining in the precipitation pan after removing the liquid, presents a most difficult, dirty and protracted process.

By the present invention this difficulty is avoided in the following manner: The solutions to be treated for regeneration and for recovery of the silver compounds therein, and the precipitant, are brought together, (the latter being preferably in slight excess) then thoroughly mixed and the solution is separated from the precipitate immediately, all in a continuous operation. This can be easily accomplished by pumping the mixed liquids continuously, directly through a filter or a suction apparatus. By this method the precipitate retains a granulated condition and presents no difficulty to filtration so as to make it feasible to rapidly work up large quantities of liquids with nearly complete recovery of the precious metals.

My invention will be more fully described hereinafter with reference to the accompanying drawing. The tank A contains the liquid to be worked up, the vessel B is filled with the precipitating agent, e. g. $Na_2S$ in solid pieces. Through the pipe $a$ water in appropriate quantity runs into B. The suction pipe $b$ of the pump C is connected with both the tank A and the vessel B by way of the conduits $c$, $d$ of appropriate diameters, fitted with throttle valves and thus sucking in both the fixing solution and the precipitating agent in the intended proportion. The precipitate formed at the conflux of the solutions is quickly transported through the delivery-pipe of the pump to the filter chamber or suction plate D which is preferably kept under diminished pressure. In this manner the precipitate is separated from the liquid within a very short time after the two liquids are brought together, and before the precipitate has a chance to become colloidal. It is evident, that in large factories it may prove advantageous to provide several vessels A and B or several chambers D or both.

By working according to this process it is necessary, for good precipitation, to apply a large surplus of the precipitating agent. Therefore the filtrate drained off contains considerable quantities of unconsumed $Na_2S$, besides thiosulphate of sodium and may not in this condition be further used as a fixing agent. Hitherto it was supposed that the method of removing a surplus of $Na_2S$ by means of sulfurous acid, as it is used in the metallurgical practice, could not be applied (with satisfactory results) to photographic fixing baths, by reason of which the precipitation was usually performed only with a small surplus of $Na_2S$, which surplus was subsequently destroyed by acidifying the filtrate with a weak organic acid or diluted mineral acids, the resulting hydric sulphide being partly expelled and partly oxidized by aeration.

I have, however, made the surprising observation, that even a large surplus of the sulphide (which is useful in producing a readily filtrable precipitate) can be decomposed by means of sulfurous acid without in the least injuring the fixing capacity of the solution. Especially the reaction with bisulphites has proved to be very advantageous; this reaction may be supposed to go on according to the following equation:

$$4Na_2S + 12NaHSO_3 = S_2 + 4Na_2S_2O_3 + 6Na_2SO_3 + 6H_2O.$$

Since the presence of the sodium sulphite formed according to this process in the fixing bath, even in high concentrations, does not prove a disadvantage, the regenerated fixing bath thus freed from the surplus of sodium-sulphide is thus adapted for reuse, and only after a long time does the high concentration of the solution render it useless for this purpose.

The precipitated sulfur may from time to time be removed from the solution by filtration.

I claim:

1. The process of recovering precious metals from used photographic fixing baths which comprises bringing together the liquid to be regenerated and a liquid precipitating agent add continuously separating the resulting precipitate from the solution, immediately after the formation of such precipitate.

2. The process of recovering the precious metals from photographic fixing baths containing a thiosulphate and of regenerating the fixing agent, which comprises bringing together the liquid to be regenerated and a solution of a sulphide, and continuously separating the precipitate from the solution immediately after the formation of such precipitate.

3. The process of recovering precious metals from used photographic fixing baths, which comprises sucking up both the used photographic fixing solution and a solution of a sulphide, the latter being in substantial excess computed upon the amount of precious metal contained in the said fixing solution, by means of a pump and at once passing the resulting mixture of precipitate and solution from said pump to a separating device, whereby the solution is separated from the precipitate before the latter assumes a substantially colloidal condition, in which filtration is difficult.

4. The process of recovering precious metals from used photographic fixing baths containing a thiosulphate, and of regenerating the fixing agent which comprises bringing together the liquid to be regenerated and a solution of a sulphide, the latter form of thin moving layers, the precipitating agent being in substantial excess computed upon the amount of precious metal contained in the said fixing solution, continuously separating the precipitate from the liquid immediately after the formation of such precipitate, and decomposing the excess of sulphide by treating the resulting liquid with an acid compound containing the sulphurous acid radical.

5. The process of recovering silver from used photographic fixing baths containing a thiosulphate, which comprises bringing together the liquid to be regenerated with a solution of a sulphide, the latter being in substantial excess computed upon the amount of silver contained in the said fixing solution, continuously separating the precipitate from liquid immediately after the formation of such precipitate, and decomposing the excess of sulphide by treating the resulting liquid with an alkali metal bisulphite.

In testimony whereof I have affixed my signature.

BRUNO THOMAS.